(12) United States Patent
Bailey et al.

(10) Patent No.: US 9,453,600 B2
(45) Date of Patent: Sep. 27, 2016

(54) EXTREME TEMPERATURE DEVICE FOR FLAT FACE SEAL FITTING

(71) Applicant: Parker-Hannifin Corporation, Cleveland, OH (US)

(72) Inventors: Burleigh George Bailey, Hilliard, OH (US); Eric Lamar Grimes, Columbus, OH (US); John Rucker, Powell, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 193 days.

(21) Appl. No.: 13/894,757

(22) Filed: May 15, 2013

(65) Prior Publication Data

US 2013/0313824 A1 Nov. 28, 2013

Related U.S. Application Data

(60) Provisional application No. 61/647,086, filed on May 15, 2012.

(51) Int. Cl.
*F16L 19/02* (2006.01)
(52) U.S. Cl.
CPC .................................. *F16L 19/0218* (2013.01)
(58) Field of Classification Search
CPC ..... F16L 17/06; F16L 17/08; F16L 19/0206; F16L 19/0212; F16L 19/025; F16L 19/05
USPC ................................................. 277/608, 616
See application file for complete search history.

(56) References Cited

U.S. PATENT DOCUMENTS

| 839,165 | A | | 12/1906 | Lund |
| 1,209,887 | A | | 12/1916 | Rothenbucher |
| 2,462,762 | A | * | 2/1949 | Nardin .......................... 277/609 |
| 4,552,389 | A | * | 11/1985 | Babuder et al. .............. 285/379 |
| 4,577,870 | A | | 3/1986 | Scott et al. |
| 4,838,583 | A | * | 6/1989 | Babuder et al. .............. 285/354 |
| 5,145,219 | A | * | 9/1992 | Babuder ........................ 285/330 |
| 5,163,721 | A | * | 11/1992 | Babuder ........................ 285/328 |
| 5,340,170 | A | * | 8/1994 | Shinohara et al. ........... 285/379 |
| 5,372,488 | A | | 12/1994 | Turner |
| 5,409,270 | A | * | 4/1995 | Shinohara et al. ........... 285/379 |
| 5,423,580 | A | * | 6/1995 | Mohlenkamp et al. ...... 285/379 |
| 5,490,680 | A | | 2/1996 | Patel et al. |
| 5,564,177 | A | | 10/1996 | Fernandes et al. |
| 5,667,257 | A | | 9/1997 | Butler et al. |
| 5,956,830 | A | | 9/1999 | Imbus et al. |
| 7,063,329 | B2 | | 6/2006 | Anderson et al. |
| 7,140,616 | B1 | | 11/2006 | Gerber |
| 2004/0145124 | A1 | * | 7/2004 | Yoakam et al. .............. 277/609 |
| 2014/0110937 | A1 | * | 4/2014 | Okabe et al. ................. 285/354 |

* cited by examiner

*Primary Examiner* — David E Sosnowski
*Assistant Examiner* — James Linford
(74) *Attorney, Agent, or Firm* — Renner, Otto, Boisselle & Sklar, LLP

(57) ABSTRACT

A metal seal replaces an O-ring seal in a flat face seal fluid fitting to adapt the flat face seal fluid fitting to use, for example, in extreme temperature applications. The fitting includes first and second fitting members, a sleeve, a nut and the seal. The seal may be removably attached to one of the fitting members by a plurality of retainers that extend into an O-ring channel of the fitting and cooperate with an O-ring retainer wall.

20 Claims, 4 Drawing Sheets

EXTREME TEMPERATURE DEVICE FOR FLAT FACE SEAL FITTING

RELATED APPLICATIONS

This application claims the benefit of U.S. Provisional Application No. 61/647,086 filed May 15, 2012, which is hereby incorporated herein by reference.

FIELD OF INVENTION

The present invention relates to a replaceable extreme temperature seal device and to a flat face seal fluid fitting in combination with the seal device. More specifically, this invention relates to an extreme temperature seal device that replaces a moderate temperature range elastomeric O-ring seal in a conventional retained O-ring flat face seal fitting to adapt the fitting to use in extreme temperature conditions without requiring other modifications to the fitting.

BACKGROUND

O-ring face seal fluid fittings are used to connect components in fluid systems. One such O-ring face seal fluid fitting is shown in U.S. Pat. Nos. 5,490,680 and 5,564,177, the disclosures of which are incorporated herein by reference. A flat face seal fluid fitting is a fluid fitting in which a sealing surface of one of the fitting members is a generally flat surface or face disposed in a plane that is generally perpendicular to the central or longitudinal axis of the fitting and a seal carried by the other fitting member engages the flat face. In this type of fluid fitting, the seal may be a conventional elastomeric O-ring that is retained in a groove in the other fitting member and that provides a fluid seal when the other fitting member is connected to the first mentioned fitting member. The elastomer material for the O-ring is selected in a known manner.

U.S. Pat. No. 5,681,064, the disclosure of which is incorporated herein by reference, is directed to fluid fittings with metal seals. These fluid fittings include conventional metal seals retained on one of the fitting members by an external retainer and providing a fluid seal when the fitting members are connected together. The metal material for the seal is selected in a known manner. In some applications, the material for the metal seal is stainless steel plated with silver.

SUMMARY OF INVENTION

Elastomer materials used in O-rings of face seal fittings may degrade at high and low temperatures, generally above 230 degrees Celsius and below −54 degrees Celsius for the most common such O-ring materials, so that O-ring face seal fittings are generally not able to be used at such temperatures. Metal seals would not degrade at extreme temperature ranges, up to about 537 degrees Celsius and down to about −150 degrees Celsius. However, conventionally, metal seals have not been used in flat face seal fittings. Conventionally, metal seals have been thought to seal best in fittings such as illustrated in above referenced U.S. Pat. No. 5,681,064 in which curved surfaces of the fitting members engage and deform the opposite sides of the flat metal seal. Thus, flat face seal fittings have been limited to using elastomeric seals such as O-rings, thus limiting face seal fittings to moderate temperature applications.

Therefore, the present invention provides a metal seal device and a flat face seal fitting with the metal seal device. More specifically, the invention provides such a flat face seal fitting in which the metal seal is easily installed and removed, so that the metal seal can be replaced when the fitting is disconnected and reconnected. Still more specifically, the invention provides such a flat face seal fitting in which a metal seal and an O-ring seal can be used interchangeably, so that the same fitting members can be used with either an O-ring seal or a metal seal. Also, the invention provides such a flat face seal fitting in which the metal seal includes an integral retaining tab that extends into and positively latches with an O-ring retaining wall to retain the metal seal in place during assembly of the fitting.

More specifically, the invention provides an extreme temperature metal seal device for a flat face seal fluid fitting, that comprises a generally flat seal body having a longitudinal axis. The seal body has longitudinally oppositely facing first and second generally flat sealing surfaces, and a central passage extends longitudinally through the seal body between the sealing surfaces. The metal seal device further comprises a longitudinally extending retainer, and the retainer has a fixed end rigidly fixed to the seal body adjacent the central passage and a free end longitudinally spaced from the seal body and an intermediate wall between the free end and the fixed end. The intermediate wall is laterally outward of the fixed end.

The passage can additionally be generally circular, and the retainer can be in the shape of a segment of a cylinder. The fixed end and free end and intermediate wall can additionally each extend circumferentially through less than about 45 degrees, with the intermediate wall laterally outward of the passage and laterally outward of the free end. Preferably, the fixed end and free end and intermediate wall each extend circumferentially through less than about 20 degrees.

Still more specifically, the intermediate wall can additionally comprise a generally C-shaped cross section, with the concave side of the C-shaped wall facing laterally inward toward the longitudinal axis and with the convex side of the C-shaped wall facing laterally outward away from the longitudinal axis and providing a smooth cam surface to displace the intermediate wall and the free end laterally inwardly when the metal seal is being installed on and removed from a face seal fitting member.

At least one and preferably two additional retainers can additionally comprise a fixed end rigidly fixed to the seal body adjacent the central passage and a free end longitudinally spaced from the seal body and an intermediate wall between the free end and the fixed end. The intermediate wall of each additional retainer is also laterally outward of its fixed end, and each additional retainer is circumferentially spaced from the first mentioned retainer around the passage. The seal body and the retainers are of one piece construction.

Still more specifically, the invention provides a metal seal device in combination with one or two cooperating flat face seal fitting members. The fitting members each comprise a generally flat sealing surface engaging one of the sealing surfaces of the metal seal, and one of the fitting members has an annular channel extending longitudinally from that fitting member sealing surface away from the seal body. A laterally extending retainer wall extends circumferentially around the channel adjacent the fitting member sealing surface, and the retainer wall has one laterally-extending surface facing axially toward the seal body and another laterally-extending surface facing axially away from the seal body with the retainer intermediate wall engaging the other laterally-extending surface.

These and other features of the invention are fully described and particularly pointed out in the claims. The following description and annexed drawings set forth in detail certain illustrative embodiments of the invention, these embodiments being indicative of but a few of the various ways in which the principles of the invention may be employed.

BRIEF DESCRIPTION OF THE DRAWINGS

Embodiments of this invention will now be described in further detail with reference to the accompanying drawings, in which.

DETAILED DESCRIPTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
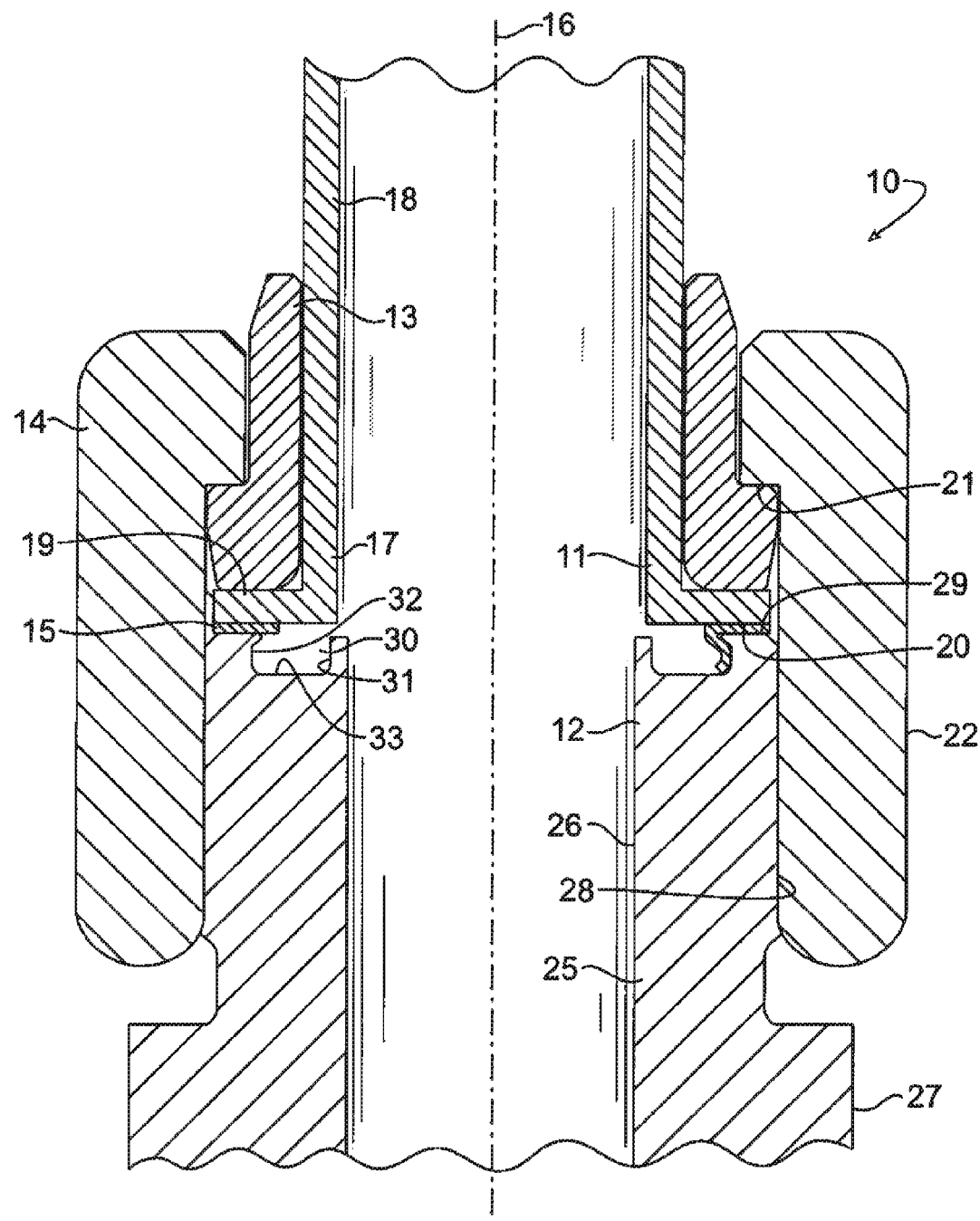
FIG. 1 is a longitudinal cross sectional view of a flat face seal fluid fitting with a metal seal according to an exemplary embodiment of the present invention.

Referring now to the drawings in greater detail, FIG. 1 illustrates an exemplary flat end face seal fluid fitting 10 having a first flat face seal fitting member 11, a second flat face seal fitting member 12, a sleeve 13, a nut 14, and a seal 15 capable of operating in extreme temperatures, all arranged in coaxial alignment along a longitudinal axis 16. The first fitting member 11, second fitting member 12, sleeve 13 and nut 14 may each be generally cylindrical and may be conventional O-ring face seal fitting components of the type generally illustrated in the above referenced U.S. Pat. Nos. 5,490,680 and 5,564,177. These components may be stainless steel or other suitable material.

The first flat face seal fitting member 11 may be of any desired configuration and in the illustrated embodiment is integrally formed on the free end 17 of a metal tube 18. The free end 17 of the tube 18 may be deformed laterally outward or laterally away from the longitudinal axis 16 to form a generally flat laterally-extending flange or wall 19 having a generally smooth, flat, annular laterally-extending sealing surface 20 disposed in a plane substantially perpendicular to the longitudinal axis 16, as illustrated. Alternatively, for example, the flat laterally-extending sealing surface 20 of the first fitting member 11 may be formed on a separate piece that is attached to the tube 18 in the manner generally illustrated in the above referenced U.S. Pat. No. 5,490,680 or in any other desired manner.

The sleeve 13 is arranged on the tube 18 on the side of the flange or wall 19 opposite the sealing surface 20. The nut 14 may include an annular flange 21 that engages the sleeve 13 and an exterior hexagonal wrench flat surface 22 that receives a suitable wrench (not shown) for tightening the nut 14 onto the second fitting member 12.

The second flat face seal fitting member 12 may include a fitting member body 25 having a central passage 26, an exterior hexagonal wrench flat surface 27 for engagement with a wrench (not shown) during assembly, and an exterior threaded end surface 28. A generally smooth, flat, annular, laterally-extending sealing surface 29 of the fitting member body 25 may be disposed in a plane generally perpendicular to the longitudinal axis 16. The surface 29 may be generally parallel to the surface 20, and the surfaces 29 and 20 face in axially opposite directions and toward one another.

Figure 7:
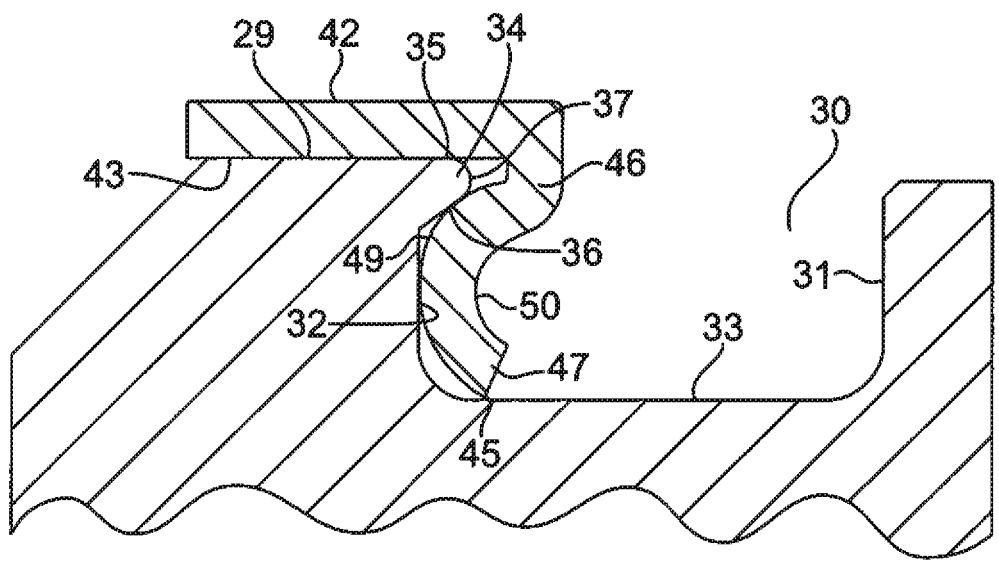
FIG. 7 is a cross sectional view taken along reference view line 7-7 in FIG. 6.

An annular groove or channel 30 may extend axially away from the sealing surface 29 into the body 25. The channel 30 includes generally cylindrical laterally inner and outer side walls 31 and 32 and a bottom wall 33. Referring to FIG. 7, a retaining wall 34 extends laterally from the outer side wall 32 across a portion of the opening of the channel 30. The retaining wall 34 includes a top surface 35 facing longitudinally away from the bottom wall 33 and a bottom or retaining surface 36 facing longitudinally toward the bottom wall 33. The top and bottom surfaces 35 and 36 meet at a laterally innermost annular edge 37 of the retainer wall 34. When the first fitting member 11, second fitting member 12, sleeve 13, and nut 14 are used as a conventional O-ring face seal fitting, the retaining wall 34 retains an elastomeric O-ring (not shown) in the channel 30 prior to and during assembly of the fitting 10 in the manner described in further detail in the above referenced U.S. Pat. Nos. 5,490,680 and 5,564,177.

Figure 2:
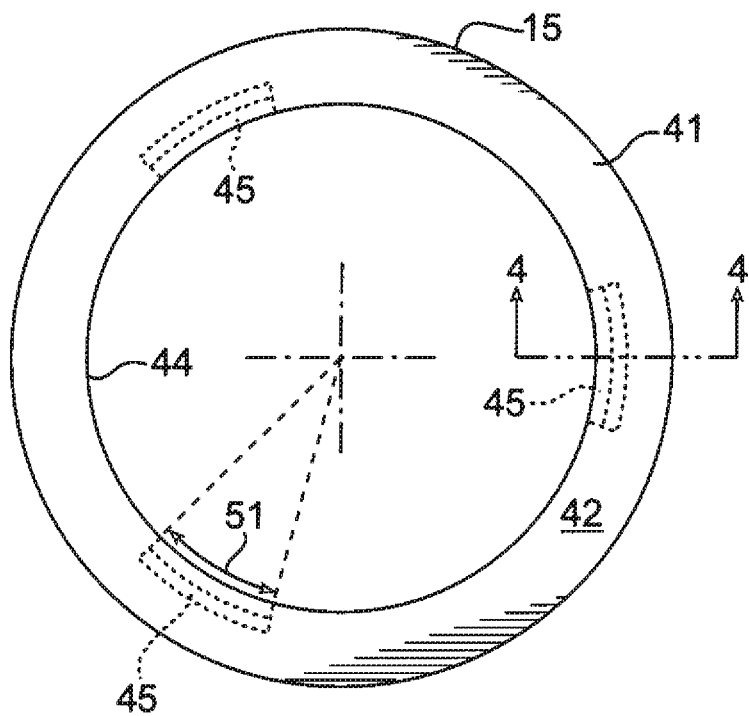
FIG. 2 is a top elevation view of the metal seal used in the fitting shown in FIG. 1.
Figure 3:
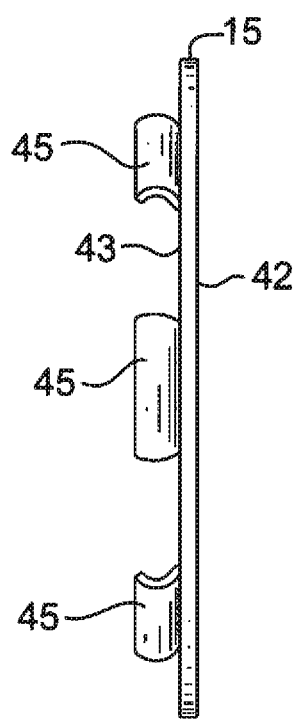
FIG. 3 is a side elevation view of the metal seal used in the fitting shown in FIG. 1.
Figure 4:
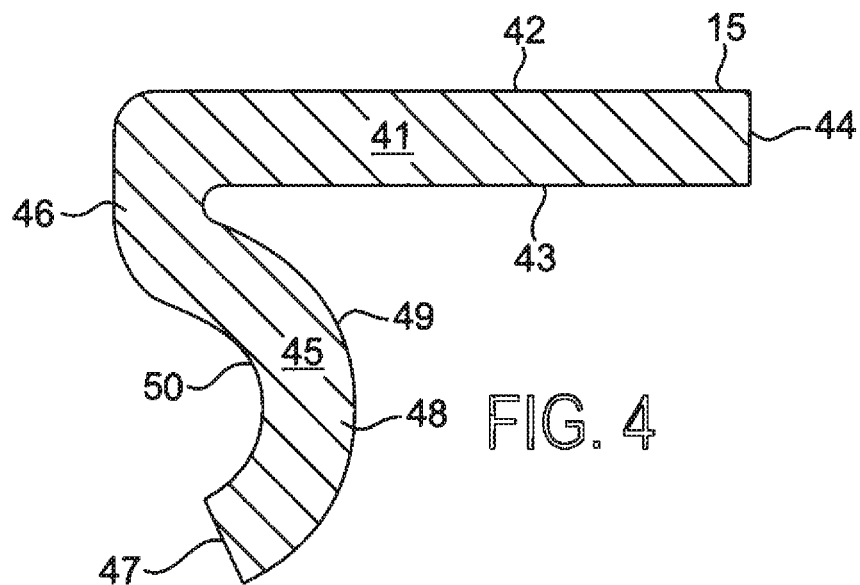
FIG. 4 is an enlarged cross sectional view taken along reference view line 4-4 in FIG. 2.

Referring now to FIGS. 2-4, the seal device 15 includes a generally flat annular seal body 41 having axially oppositely facing annular sealing surfaces 42 and 43 and a central passage 44 extending axially through the body 41 between the sealing surfaces 42 and 43. The seal device 15 is of any suitable metal material, and in an exemplary embodiment the seal device 15 is of stainless steel plated with silver. The seal device 15 further includes at least two and preferably three longitudinally extending retainers 45, each of which is in the general configuration of a segment of a cylinder. The body 41 and retainers 45 are of integral one piece construction, with the body 41 and retainers 45 first stamped from a stainless steel blank and with the retainers 45 then bent to the position illustrated in the drawings relative to the body 41. Each retainer 45 includes a fixed end 46 secured to, for example, the laterally innermost portion of the sealing surfaces 42 and 43 adjacent the central passage 44, a free end 47 spaced longitudinally away from the sealing surfaces 42 and 43, and an intermediate wall 48 extending between the fixed end 46 and free end 47 (however, it is also contemplated that the fixed end may be secured to, for example, the laterally outermost portion of the sealing surfaces 42 and 43). As illustrated in the drawings, the intermediate wall 48 is disposed laterally away from (for example, outwardly) of the fixed end 46, free end 47 and central passage 26. The intermediate wall 48 is generally C-shaped with a generally smooth convex outer surface 49 facing laterally outwardly away from the longitudinal axis 16 and a corresponding concave inner surface 50 facing laterally inwardly toward the longitudinal axis 16. Each retainer 45 extends circumferentially through an angle 51 of less than about 45 degrees and preferably less than about 20 degrees, and the retainers 45 are spaced equidistantly about the central passage 44.

Figure 5:
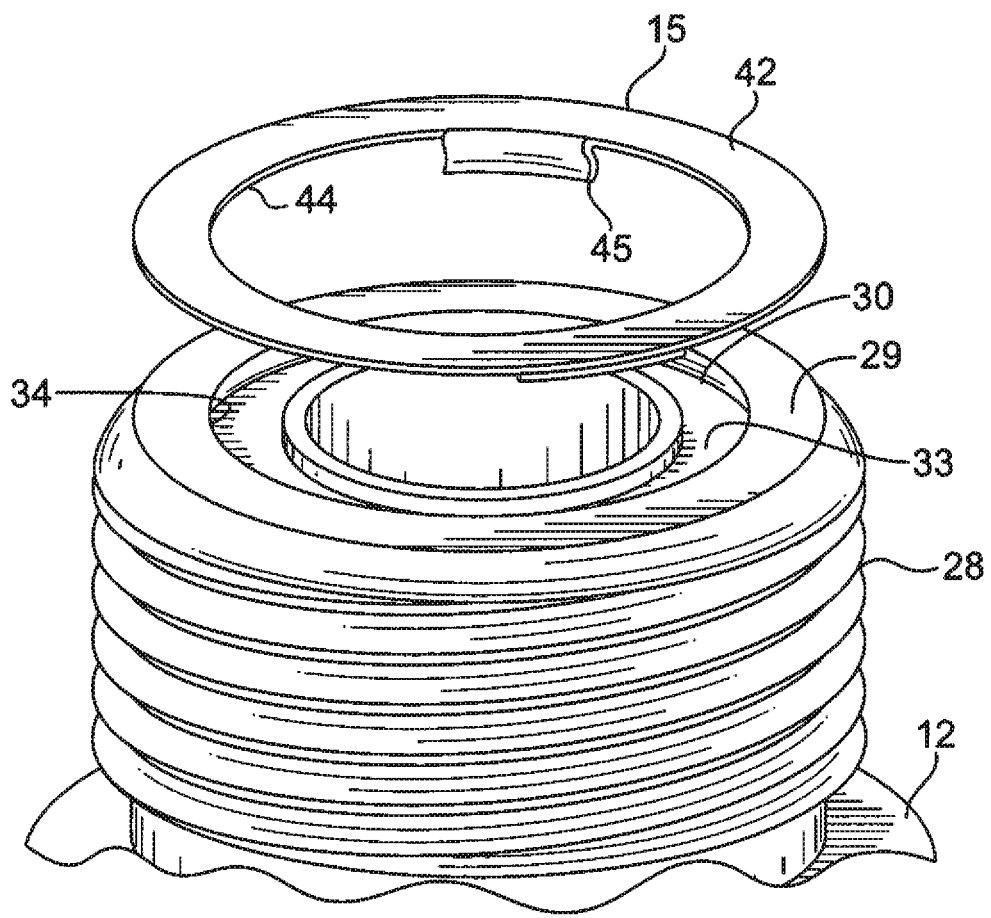
FIG. 5 is perspective view of the metal seal and a fitting member of the face seal fluid fitting illustrated in FIG. 1, before assembly of the metal seal onto the fitting member.
Figure 6:
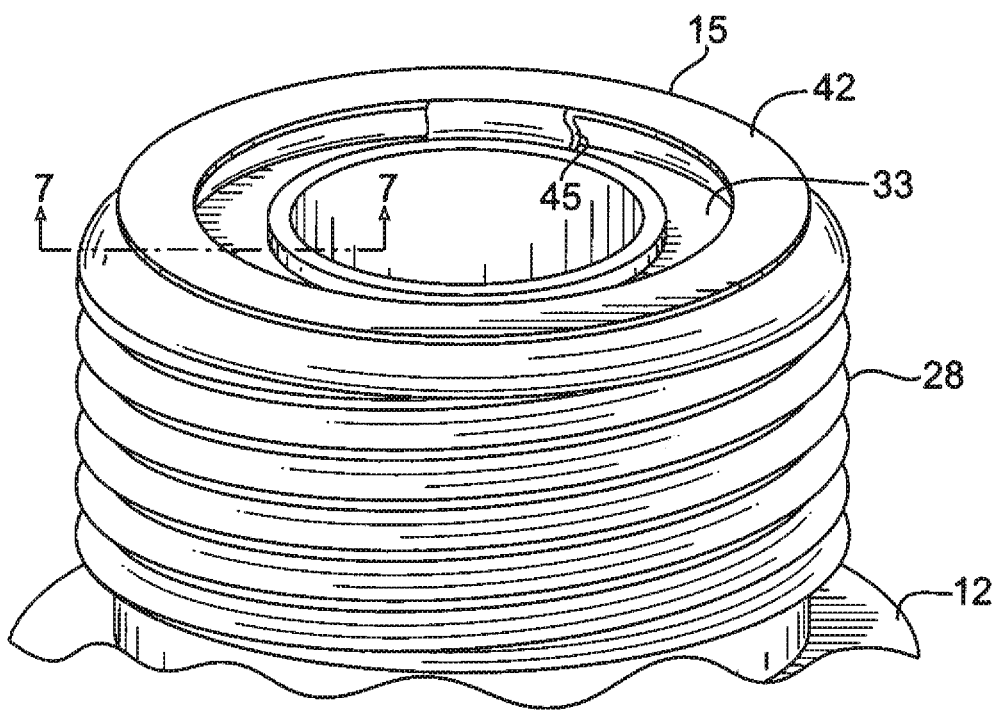
FIG. 6 is a view similar to FIG. 5, but showing the metal seal and fitting member after assembly of the metal seal onto the fitting member.

Referring now to FIGS. 5-7, FIG. 5 illustrates the second flat face seal fitting member 12 and seal device 15 before assembly of the seal device 15 onto the second fitting member 12 while FIGS. 6 and 7 illustrate the seal device 15 in an assembled position on the second fitting member 12. As shown in FIG. 5, the seal device 15 before assembly onto the second fitting member 12 is positioned in a first position with the seal body 41 aligned with the sealing surface 29 of the second fitting member 12. In this position, the free end 47 of each retainer 45 is aligned with the channel 30 and is laterally inward of the laterally innermost edge 37 of the retaining wall 34 so that the convex outer surface 49 of each retainer 45 engages the edge 37.

The seal device 15 is then advanced axially toward the second fitting member 12 to the assembled or second position shown in FIGS. 6 and 7. As the seal device 15 is moved toward its second position, the convex outer surface 49 of each retainer 45 engages the edge 37 of the retailing wall 34 and provides a smooth cam surface to resiliently deflect the retainers 45 laterally inwardly toward the longitudinal axis 16. As the seal device 15 reaches its second position shown in FIGS. 6 and 7, the retainers 45 each then move laterally outwardly so that the convex outer wall 49 of each retainer 45 engages both the bottom or retaining surface 36 of the retaining wall 34 and the outer wall 32 of the channel 30. In the assembled or second position of the seal device 15 shown in FIGS. 6 and 7, the retainers 45 position and hold the seal device 15 in proper alignment with the second fitting member 12, so that the sealing surface 43 of the seal device 15 and the sealing surface 29 of the second fitting member 12 are aligned and engage one another before and during assembly of the second fitting member 12 and first fitting member 11. After the seal device 15 is assembled on the second fitting member 12 in this manner, the first and second fitting members 11 and 12 are connected together, for example, by threaded engagement of the nut 14 and second fitting member 12 to provide the fully assembled fluid fitting 10 with the extreme temperature sealing device 15 illustrated in FIG. 1. In this fully assembled position, the flat annular sealing surfaces 29 and 43 engage one another with sealing contact, and the flat annular sealing surfaces 20 and 42 also engage one another with sealing contact. Because the sealing device 15 is of metal, it may be used in extreme high and low temperature applications. Further, the seal device 15 adapts or converts a conventional O-ring face seal fluid fitting into an extreme high or low temperature fluid fitting by replacing the O-ring with the sealing device 15 and without requiring additional modifications. If the fluid fitting 10 is disconnected by unthreading the first and second fitting members 11 and 12, the fitting 10 can be reused by manually removing the sealing device 15 from the second fitting member 12 and manually replacing it with a new sealing device 15, all without use of tools. During manual removal, the outwardly facing convex surface 49 of each retainer 45 acts as a cam against the edge 37 of the retainer wall 34 to deflect the retainers 45 laterally inwardly to permit removal past the retainer wall 34. Because the silver plating on the sealing surfaces 42 and 43 of the seal device 15 is softer than the material of the sealing surfaces 20 and 29, the sealing surfaces 20 and 29 are not scratched or otherwise degraded during use or during removal so that a new seal device 15 will again seal against the surfaces 20 and 29 and the fitting 10 can in this manner be reused multiple times with a new seal device 15 installed for each use.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. Also, while terms such as first and second, one and another, top and bottom are used to more clearly describe the structure and operation of the specific embodiment of the invention, it should be understood these terms are used for purposes of clarity and may be interchanged as appropriate. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A metal seal in combination with a flat face seal fluid fitting, the metal seal comprising:
    a generally flat annular seal body defining a central axis and a central passage extending axially through the seal body along the central axis and between axially oppositely facing first and second generally flat annular sealing surfaces;
    a longitudinally extending retainer, the retainer having:
        a fixed end rigidly fixed to the seal body,
        a free end axially spaced from the seal body, and
        an intermediate wall extending between the free end and the fixed end, the intermediate wall extending laterally away from the fixed end,
        wherein the fixed end is fixed to the seal body at the central passage and inwardly of an outer periphery of the seal body; and
    the fitting member having:
        a first end with a generally flat sealing surface engaging one of the flat sealing surfaces of the metal seal,
        an annular channel extending axially into the fitting member first end and axially away from the fitting member sealing surface, and
        a laterally extending retainer wall extending circumferentially around the channel adjacent the fitting member sealing surface, the retainer wall having an inner surface facing axially away from the seal body and an outer surface abutting the seal body, and the retainer intermediate wall engages the inner surface.

2. A combination as set forth in claim 1, wherein the passage is generally circular, the retainer is in the shape of a segment of a cylinder, the fixed end and free end and intermediate wall each extend circumferentially through less than about 45 degrees, and the intermediate wall is laterally outward of the passage and laterally outward of the free end.

3. A combination as set forth in claim 2, wherein the fixed end and free end and intermediate wall each extend circumferentially through less than about 20 degrees.

4. A combination as set forth in claim 1, wherein the intermediate wall has a generally C-shaped cross section, the concave side of the C-shaped wall faces laterally inward, and the convex side of the C-shaped wall faces laterally outward and provides a smooth cam surface to displace the intermediate wall and the free end laterally inwardly when the metal seal is being installed on and removed from a face seal fitting member.

5. A combination as set forth in claim 4, wherein the intermediate wall is laterally outward of the free end.

6. A combination as set forth in claim 1, wherein the intermediate wall is laterally outward of the free end.

7. A combination as set forth in claim 1, wherein the retainer is a first retainer and the metal seal further includes a second retainer having a second fixed end rigidly fixed to the seal body adjacent the central passage and a second free end axially spaced from the seal body and a second intermediate wall between the second free end and the second fixed end, the second intermediate wall of the second retainer is laterally outward of the second fixed end, and the second retainer is circumferentially spaced from the first retainer around the central passage.

8. A combination as set forth in claim 7, including a third retainer having a third fixed end rigidly fixed to the seal body adjacent the central passage and a third free end axially spaced from the seal body and a third intermediate wall between the third free end and the third fixed end, the third intermediate wall is laterally outward of the third fixed end, and the third retainer is circumferentially spaced from the first and second retainers around the passage.

9. A combination as set forth in claim 1, wherein the intermediate wall extends laterally outwardly from the fixed end.

10. A fluid fitting assembly comprising:
a metal seal having:
a generally flat annular seal body defining a central axis and a central passage extending axially through the seal body along the central axis and between axially oppositely facing first and second generally flat annular sealing surfaces that extend from a radially inner periphery of the seal body to a radially outer periphery of the seal body, and
a longitudinally extending retainer, the retainer including a fixed end rigidly fixed to the seal body, a free end axially spaced from the seal body, and an intermediate wall extending between the free end and the fixed end, the intermediate wall extending laterally away from the fixed end;
a first end face seal fitting member having a generally flat sealing surface;
and
a second end face seal fitting member having:
a generally flat sealing surface at a first end,
an annular channel extending axially into the second fitting member first end and axially away from the sealing surface of the second fitting member,
a laterally extending retainer wall extending circumferentially about the channel adjacent the fitting member sealing surface, the retainer wall having an inner surface facing axially away from the seal body and an outer surface abutting the seal body, and the retainer intermediate wall engages the inner surface.

11. A fluid fitting assembly as set forth in claim 10, wherein the fixed end is fixed adjacent the central passage.

12. A fluid fitting assembly as set forth in claim 10, wherein the passage is generally circular, the retainer is in the shape of a segment of a cylinder, the fixed end and free end and intermediate wall each extend circumferentially through less than about 45 degrees, and the intermediate wall is laterally outward of the passage and laterally outward of the free end.

13. A fluid fitting assembly as set forth in claim 10, wherein the intermediate wall has a generally C-shaped cross section, the concave side of the C-shaped wall faces laterally inward, and the convex side of the C-shaped wall faces laterally outward and provides a smooth cam surface to displace the intermediate wall and the free end laterally inwardly when the metal seal is being installed on and removed from a face seal fitting member.

14. A fluid fitting assembly as set forth in claim 10, wherein the intermediate wall is laterally outward of the free end.

15. A fluid fitting assembly as set forth in claim 10, wherein the retainer is a first retainer and the metal seal further includes a second retainer having a second fixed end rigidly fixed to the seal body adjacent the central passage and a second free end axially spaced from the seal body and a second intermediate wall between the second free end and the second fixed end, the second intermediate wall of the second retainer is laterally outward of the second fixed end, and the second retainer is circumferentially spaced from the first retainer around the central passage.

16. A fluid fitting assembly as set forth in claim 10, wherein the intermediate wall extends laterally outwardly from the fixed end.

17. A metal seal for a flat face seal fluid fitting, comprising:
a generally flat annular seal body defining a central axis and a central passage extending axially through the seal body along the central axis and between axially oppositely facing first and second generally flat annular sealing surfaces;
a longitudinally extending retainer, the retainer having:
a fixed end rigidly fixed to the seal body,
a free end axially spaced from the seal body, and
an intermediate wall extending between the free end and the fixed end,
the intermediate wall extending axially away from the fixed end,
wherein the intermediate wall has a generally C-shaped cross section, the concave side of the C-shaped wall faces radially inward, and the convex side of the C-shaped wall faces radially outward and provides a smooth cam surface to displace the intermediate wall and the free end radially inwardly when the metal seal is being installed on and removed from a face seal fitting member, wherein the retainer has only a single curve between the free end and the fixed end so as to form an overall C-shape.

18. A metal seal as set forth in claim 17, wherein the seal body and the retainer are of one piece construction.

19. A metal seal as set forth in claim 17, wherein the intermediate wall is laterally outward of the free end.

20. A metal seal as set forth in claim 17, wherein the retainer is a first retainer and the metal seal further includes a second retainer having a second fixed end rigidly fixed to the seal body adjacent the central passage and a second free end axially spaced from the seal body and a second intermediate wall between the second free end and the second fixed end, the second intermediate wall of the second retainer is laterally outward of the second fixed end, and the second retainer is circumferentially spaced from the first retainer around the central passage.

* * * * *